(12) United States Patent
Subbiah et al.

(10) Patent No.: US 9,737,858 B2
(45) Date of Patent: Aug. 22, 2017

(54) METHOD AND A SYSTEM FOR MONITORING AND CONTROL OF FOULING AND OPTIMIZATION THEREOF OF TWO SIDE MEMBRANE FOULING PROCESS

(75) Inventors: Senthilmurugan Subbiah, Kovilpatti (IN); Srinivas Mekapati, Arundelpet (IN)

(73) Assignee: ABB Schweiz AG, Baden (CH)

( * ) Notice: Subject to any disclaimer, the term of this patent is extended or adjusted under 35 U.S.C. 154(b) by 545 days.

(21) Appl. No.: 14/369,975

(22) PCT Filed: Dec. 23, 2011

(86) PCT No.: PCT/IB2011/003149
§ 371 (c)(1),
(2), (4) Date: Aug. 19, 2014

(87) PCT Pub. No.: WO2013/093537
PCT Pub. Date: Jun. 27, 2013

(65) Prior Publication Data
US 2015/0114905 A1  Apr. 30, 2015

(51) Int. Cl.
*B01D 61/58*  (2006.01)
*B01D 65/10*  (2006.01)
*G05D 7/00*  (2006.01)
*B01D 65/02*  (2006.01)
(Continued)

(52) U.S. Cl.
CPC ............. *B01D 65/02* (2013.01); *B01D 61/08* (2013.01); *B01D 61/12* (2013.01); *B01D 61/58* (2013.01);
(Continued)

(58) Field of Classification Search
CPC ........ B01D 61/08; B01D 61/58; B01D 61/12; B01D 61/02; B01D 61/025; B01D 61/002;
(Continued)

(56) References Cited

U.S. PATENT DOCUMENTS 6,168,714 B1 * 1/2001 Ilias ...................... B01D 61/02
                                                                210/195.2
8,357,299 B2 * 1/2013 Ginzburg ............... B01D 61/18
                                                                210/650
(Continued)

FOREIGN PATENT DOCUMENTS

JP   2001-062255 A   3/2001
WO   WO 02/28517 A1   4/2002
(Continued)

OTHER PUBLICATIONS

International Search Report (PCT/ISA/210) mailed on Mar. 23, 2012, by the European Patent Office as the International Searching Authority for International Application No. PCT/IB2011/003149.
(Continued)

*Primary Examiner* — Joseph Drodge
(74) *Attorney, Agent, or Firm* — Barnes & Thornburg LLP

(57) ABSTRACT

Methods are disclosed for monitoring, controlling and optimizing fouling of a two side membrane fouling process. The method for monitoring fouling of a two side membrane fouling process can include determining the process model for the two side membrane fouling process. The parameters of the process model can be grouped based on the interactions thereof between the parameters so as to form one or more groups of parameters. At least one key performance index is estimated in relation to one or more groups of parameters. The fouling of the two side membrane fouling process is monitored correspondingly in relation to at least one key performance index.

19 Claims, 3 Drawing Sheets

(51) Int. Cl.
*C02F 1/00* (2006.01)
*G06G 7/50* (2006.01)
*G06G 7/57* (2006.01)
*B01D 65/08* (2006.01)
*B01D 61/12* (2006.01)
*B01D 61/08* (2006.01)
*C02F 1/44* (2006.01)
*B01D 61/00* (2006.01)
*B01D 61/02* (2006.01)

(52) U.S. Cl.
CPC ............ *B01D 65/08* (2013.01); *B01D 65/10* (2013.01); *C02F 1/008* (2013.01); *C02F 1/441* (2013.01); *G06G 7/50* (2013.01); *G06G 7/57* (2013.01); *B01D 61/002* (2013.01); *B01D 61/025* (2013.01); *B01D 2311/10* (2013.01); *B01D 2311/14* (2013.01); *B01D 2311/16* (2013.01); *B01D 2311/246* (2013.01); *C02F 2209/40* (2013.01)

(58) Field of Classification Search
CPC ...... B01D 61/005; B01D 61/10; B01D 61/20; B01D 61/22; B01D 65/02; B01D 65/08; B01D 65/10; B01D 2311/246; B01D 2311/04; B01D 2311/10; B01D 2311/14; B01D 2311/16; C02F 1/008; C02F 1/44; C02F 1/441; C02F 2209/00; C02F 2209/005; C02F 2209/05; C02F 2209/09; C02F 2209/10; C02F 2209/40; G06G 7/50; G06G 7/57; G06G 7/58; G06F 17/50
USPC ....... 210/85, 87, 96.1, 97, 106, 143, 321.69, 210/636, 644, 649, 650, 739; 703/7, 9, 703/12; 700/273
See application file for complete search history.

(56) References Cited

U.S. PATENT DOCUMENTS

| | | | | |
|---|---|---|---|---|
| 8,918,217 | B2* | 12/2014 | Subbiah | B01D 61/12 422/105 |
| 9,248,406 | B2* | 2/2016 | Subbiah | B01D 61/12 |
| 2005/0258098 | A1 | 11/2005 | Vincent et al. | |
| 2007/0029255 | A1* | 2/2007 | D'Amato | B01D 1/0011 210/637 |
| 2008/0017576 | A1* | 1/2008 | Belfort | B01D 61/142 210/641 |
| 2010/0018390 | A1* | 1/2010 | Hart | B01D 53/0407 95/22 |
| 2010/0044318 | A1* | 2/2010 | Stanton | C02F 3/20 210/742 |
| 2010/0183903 | A1* | 7/2010 | McGinnis | F03G 7/005 429/50 |
| 2010/0204924 | A1* | 8/2010 | Wolfe | C02F 1/008 702/25 |
| 2011/0035195 | A1* | 2/2011 | Subbiah | B01D 61/12 703/2 |
| 2011/0203994 | A1* | 8/2011 | McGinnis | B01D 61/002 210/650 |
| 2011/0257788 | A1* | 10/2011 | Wiemers | B01D 61/022 700/267 |
| 2012/0067819 | A1* | 3/2012 | McGinnis | B01D 3/145 210/640 |
| 2012/0285886 | A1 | 11/2012 | Liberman | |
| 2013/0001162 | A1* | 1/2013 | Yangali-Quintanilla | B01D 61/002 210/636 |
| 2013/0075331 | A1 | 3/2013 | Peiris et al. | |

FOREIGN PATENT DOCUMENTS

| | | |
|---|---|---|
| WO | WO 2009/104035 A1 | 8/2009 |
| WO | WO 2010/109265 A1 | 9/2010 |
| WO | WO 2011/064252 A1 | 6/2011 |
| WO | WO 2011/064731 A1 | 6/2011 |
| WO | WO 2011/153625 A2 | 12/2011 |

OTHER PUBLICATIONS

Written Opinion (PCT/ISA/237) mailed on Mar. 23, 2012, by the European Patent Office as the International Searching Authority for International Application No. PCT/IB2011/003149.

* cited by examiner

METHOD AND A SYSTEM FOR MONITORING AND CONTROL OF FOULING AND OPTIMIZATION THEREOF OF TWO SIDE MEMBRANE FOULING PROCESS

FIELD OF THE INVENTION

The invention relates to two side membrane fouling process, and more particularly to a method and a system for monitoring and control of fouling and providing optimization solution in respect of two side membrane fouling process.

BACKGROUND

Generally, the membrane used in a membrane based separation process is susceptible to fouling. The fouling occurs only on one side of the membrane i.e., on the feed side of the membrane in membrane based separation process such as ultra-filtration (UF), micro-filtration (MF), nano-filtration (NF) and reverse osmosis (RO). This is due to the fact that, only the feed side of the membrane gets exposed to salt water, while the other side i.e., the draw solute side of the membrane is exposed to pure water. Therefore, monitoring of membrane fouling and providing optimization solution in respect of the membrane fouling process is oriented towards one side of the membrane due to the fouling occurring on one side of the membrane.

However, in membrane based separation process like forward osmosis (FO), pressure retarded osmosis (PRO), etc., fouling occurs on both the sides of the membrane, with the membrane being exposed to salt water on both sides but with different levels of salt concentration. For instance, in pressure retarded osmosis process the pretreated river/brackish water or the feed solution is supplied at feed side of the membrane and pretreated sea water or draw solution is supplied at draw water solution side, and it is vice versa in forward osmosis process. The feed and draw solution can also come from different sources, e. g, when pressure retarded osmosis is coupled with desalination process, concentrated brine of sea water desalination process or reject sea water can be used as a draw solution and the pretreated sea water/brackish water can be used as a feed solution.

Practically, both the sea water and river water contains micro organisms, organic and inorganic contents that causes fouling/scaling at both the sides of the membrane surface. The membrane blockage due to micro organism and organic content is called as fouling and the membrane blockage due to inorganic content is called as scale. Therefore the word fouling and scaling are interchangeable in this context. The intensity of fouling will be different on one side of the membrane surface with respect to the other depending upon the type of water i.e., sea water or river water, to which the corresponding side/surface of the membrane is exposed to. Accordingly, the surface of the membrane exposed to sea water is subjected to fouling at a larger scale as compared to the other side that being exposed to river water or vice versa and it will depend on quality of water source. Therefore, it becomes imperative to monitor and control fouling of the membrane on both the sides, so as for the membrane separation process to be efficient.

The rate of fouling at both the sides of the membrane is affected by operating conditions of the membrane such as water flux across the membrane, head between feed and draw solution side of the membrane etc. Hence there is a need for a solution that provides online monitoring and control of fouling and provides optimization thereof in relation to two sides of the membrane.

The invention is aimed at providing a solution that caters to the need for online monitoring and control of fouling, and of the optimization thereof of two side membrane processes.

Objects of the Invention

It is an object of the invention to provide a method for monitoring fouling on two sides of the membrane.

It is another object of the invention to provide a method to control fouling occurring on both sides of the membrane.

It is yet another object of the invention to provide a method to estimate optimal operation conditions for the membrane separation process.

Further object of the invention is to provide a system for performing the method of the invention.

SUMMARY OF THE INVENTION

Accordingly the present invention provides a method for monitoring fouling of a two side membrane fouling process. The method for monitoring fouling of a two side membrane fouling process comprises determining the process model for the said two side membrane fouling process. The parameters of the said process model are grouped based on the interactions thereof between the parameters so as to form one or more groups of parameters. At least one key performance index is estimated in relation to one or more groups of parameters. And, the fouling of the said two side membrane fouling process is monitored correspondingly in relation to at least one key performance index.

Accordingly, the present invention also provides a method for controlling fouling of a two side membrane fouling process. The method for controlling fouling of a two side membrane fouling process comprises determining the process model for the said two side membrane fouling process. The parameters of the said process model are grouped based on the interactions thereof between the parameters so as to form one or more groups of parameters. At least one key performance index is estimated in relation to one or more groups of parameters. And, the fouling of the said two side membrane fouling process is controlled correspondingly in relation to at least one key performance index by altering the flow of solution on either side or both sides of the two side membrane.

Accordingly, the present invention also provides a method for optimizing the two side membrane process by estimating optimal operating conditions for the said two side membrane process based on the objective function, and considering the fouling of the said two side membrane.

BRIEF DESCRIPTION OF THE DRAWINGS

With reference to the accompanying drawings in which.

DETAILED DESCRIPTION

Figure 1:
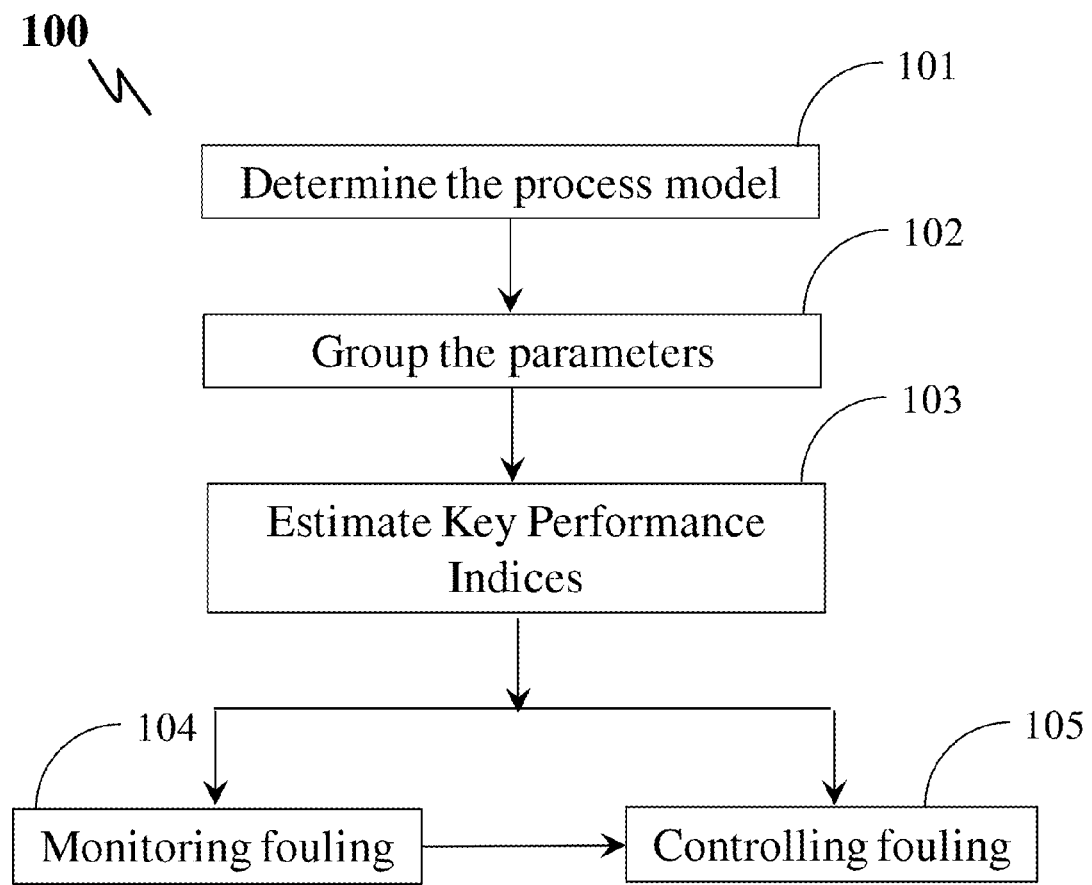
FIG. 1 illustrates the method for monitoring and controlling fouling of a two side membrane fouling process, in accordance with the invention.
Figure 2A:
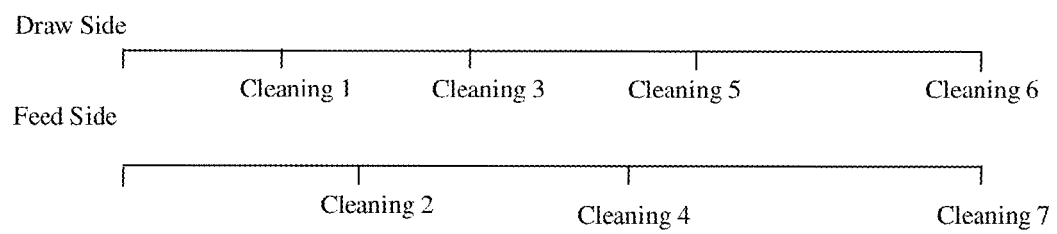
FIGS. 2a and 2b shows the cleaning sequence of the membrane without alteration in the flow and with optimal alteration in the flow, respectively.
Figure 2B:
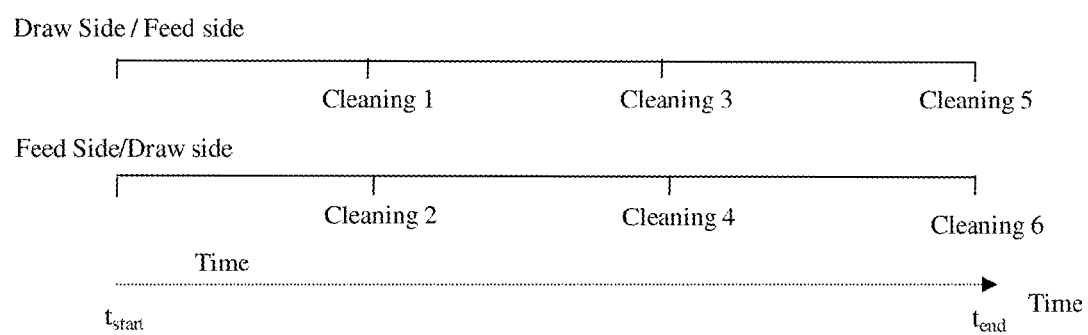
Figure 3:
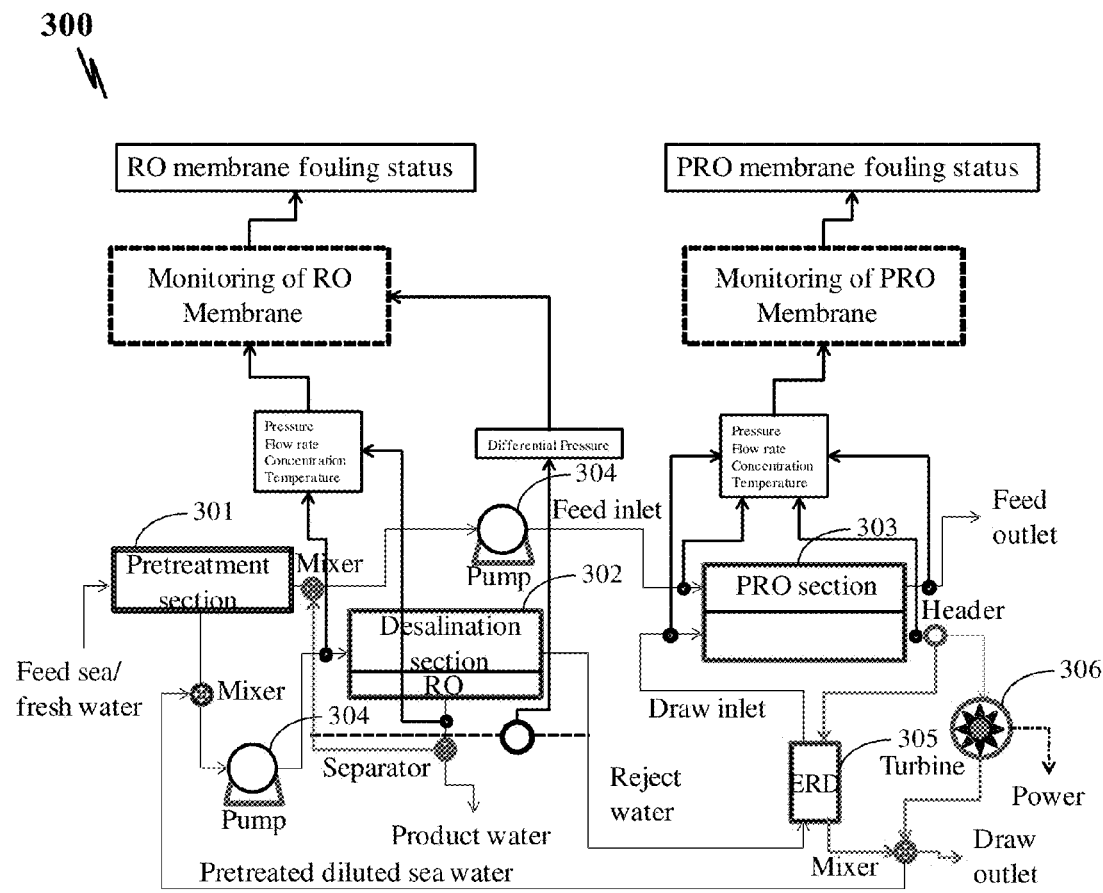
FIG. 3 depicts the schema of integrated desalination and pressure retarded osmosis processes and its monitoring thereof.

The invention is described in details with reference to non exhaustive exemplary embodiments and to FIGS. 1 to 3. In accordance with the invention the online and offline monitoring of fouling of two side membrane process and optimization thereof of the membrane process like Forward Osmosis (FO), Pressure Retarded Osmosis (PRO) provides advanced operational support and enhances plant operational efficiency, and also provide sustainable final power output from osmotic power plant.

The advanced operational activities include the steps of: a) identifying and calculating Key Performance Indices (KPIs) of two side membrane fouling process for monitoring membrane fouling, b) altering the flow between feed and draw solution based on KPIs in order to maintain almost same fouling rate on both sides of the two side membrane to achieve more product flow rate and c) estimating optimal operation conditions for energy or cost efficient or maintenance free operations.

In FIG. 1, the method of the invention (100) for monitoring and controlling fouling of a two side membrane fouling process is illustrated. In which, the process model of the two side membrane fouling process is determined (101). The parameters of the process model are grouped (102) based on the interactions thereof between the parameters so as to form one or more groups of parameters. Key performance index/indices are estimated (103) in relation to one or more groups of parameters. And, the fouling of the said two side membrane fouling process is monitored (104) correspondingly in relation to at least one key performance index. Also, the fouling of the said two side membrane fouling process is controlled (105) correspondingly in relation to at least one key performance index by altering the flow of solution on either side or both sides of the two side membrane.

The invention is further explained considering a non exhaustive example of PRO process. The PRO membrane typically consists of two layers namely selective layer, and porous sub-layer or support layer. The selective layer separates the salt molecules from sea water and support layer provides support to selective layer for withstanding very high head at selective layer side. The water molecules will transfer through the two layers of the membrane from high water concentration i.e. river water side to low water concentration i.e. sea water side. Similarly salt molecule will transfer across the two layers of membrane from high salt concentration i.e. sea water side to low concentration i.e. river water side.

During this mass transfer process, the salt molecules are accumulated at membrane boundary layer due to high concentration gradient between sea water and river water solution and membrane surface. This process is called as concentration polarization (CP).

Fouling occurs at both sides of the membrane due to concentration polarization (CP). Concentration polarization (CP) works in a different way for the Forward Osmosis (FO) process. It is named as external concentration polarization (ECP) if CP occurs at the membrane surface, and is named as internal concentration polarization (ICP) if CP occurs within the membrane sub-layer. Since the feed is always concentrated and the draw solution is always diluted in the FO process, there exists concentrative CP and dilutive CP at the feed and draw solution sides, respectively. FO membranes are mostly asymmetric with the feed and the draw solution flowing co-currently or counter-currently along different sides of the membrane. When the feed flows against the membrane selective layer and the draw solution flows against the porous sub layer, namely in FO mode, there exists concentrative ECP at the feed side and dilutive ICP at the draw solution side. Similarly, there will be concentrative ICP and dilutive ECP when the feed solution flows against the sublayer, while the draw solution flows against the selective layer, i.e., pressure-retarded osmosis (PRO) mode. The adjustment of velocity may largely suppress the influence of ECP. However, the influence of ICP cannot be effectively reduced because ICP occurs and exists within the porous sub-layer instead of at membrane surface.

The mathematical equation for water and salt transfer across the PRO membrane selective layer and porous sub-layer can be explained through membrane transport mechanism theory. The irreversible thermodynamic (IT) based models are able to capture membrane transport behavior more accurately for reverse osmosis applications. However in reverse osmosis mode both salt and water flux will be in co-current direction, but in both FO and PRO mode, salt and water flux will be in counter-current direction. Therefore irreversible thermodynamic (IT) model has to be modified with respect to PRO/FO mode. The modified model equations for binary system (NaCl+water) are given below, Water flux at local points of membrane selective layer is $$J_w = A(\sigma \Delta \pi - \Delta P) \tag{1}$$

$$\Delta \pi = \pi_2 - \pi_3$$

$$\Delta P = P_2 - P_3$$

$$\pi = \frac{\upsilon RT}{M_w} c$$

where,
$J_w$ is water flux (m³/m²·s)
$\pi$ is osmotic pressure (Pa)
A is water permeability across the membrane (m³/m²·s·Pa)
$\sigma$ is reflection coefficient (–)
P is pressure (Pa)
$\Delta P$ is differential pressure across the membrane between draw and feed solution (Pa)
$\Delta \pi$ is differential osmotic pressure across the membrane between draw and feed solution (Pa)
$\upsilon$ is Vant Hoff factor=2 for NaCl (–)
R is gas constant (m³·Pa/kmol·° K)
T is temperature of solution feed/draw (° K)
C is concentration of solution (kg/m³)
$M_w$ is molecular weight (kg/kmol)
Salt flux at local points of membrane selective layer is $$J_s = \frac{(1-\sigma)J_v\left(c_2 - c_3 \exp\left(\frac{(1-\sigma)J_v}{P_m}\right)\right)}{\exp\left(\frac{(1-\sigma)J_v}{P_m}\right) - 1} \tag{2}$$

where,
$J_S$ is solute flux (kg/s)
$P_m$ is solute permeability (m/s)

The water flux equation of selective membrane layer will not be affected by CP at boundary layer and membrane support layer. But at membrane selective layer solute flux equation will be affected by CP at boundary layer and membrane support layer.

Similarly in PRO, dilute ECP is occurring at draw solution side and in this case the convective water flow displaces and drags the dissolved draw solutes away from the membrane surface on the permeate side of the membrane. This reduces the effective driving force of the draw solution.

The solute concentration at membrane surface of dilutive ECP side can be derived from film theory, $$\frac{c_2}{c_1} = \exp\left(-\frac{J_w}{k_{DECP}}\right) \quad (3)$$

$$\frac{k_{DECP} d_e}{D} = a\left(\frac{\mu}{D\rho}\right)^b \left(\frac{V_F d_e \rho}{\mu}\right) \quad (4)$$

where,
$d_e$ is Equivalent diameter,
$\rho$ is Density of feed,
$\mu$ is Viscosity of feed,
D is diffusivity, and
$V_F$ is Velocity of feed
$K_{DECP}$ is mass transfer coefficient of dilutive external concentration polarization at boundary layer (m/s)
D is diffusivity of salt molecules in water (m²/s)
$d_e$ is equivalent diameter (m)
$\mu$ is viscosity of draw and feed solution (Pa·s)
$\rho$ is density of draw and feed solution (kg/m³)
$V_F$ is velocity of solution (current case it is draw solution) (m/sec)

Similarly, the concentrative internal concentration polarization occurs at feed solution side, here the convective water flow drags solute from the bulk solution to the surface of the rejecting active layer. The solute concentration at membrane surface of concentrative ICP side can be derived from film theory, $$\frac{c_3}{c_4} = \exp\left(\frac{J_w}{k_{CICP}}\right) \quad (5)$$

where,
$K_{CICP}$ is mass transfer coefficient of concentrative internal concentration polarization at porous sub-layer layer (m/s)

In PRO mode, the concentrative ICP occurs where velocity of feed stream is zero therefore the Sherwood number is constant i.e. equivalent to 2

$$\frac{k_{CICP} d_e}{D} = 2 \quad (6)$$

By solving the system of nonlinear equations 1 to 6, the water and solute flux can be estimated at membrane local points. Further depending upon membrane model configuration i.e. spiral or hollow fiber module, the mass and momentum balance equations can be integrated.

In the above model equations, the parameters such as water permeability (A), Solute permeability ($P_m$), and reflection coefficient ($\sigma$) are membrane transport parameters. The mass transfer coefficients of DECP ($K_{DECP}$) and CICP ($K_{CICP}$) are mass transfer resistance parameters. All this parameters will indirectly represent the fouling condition of PRO membrane.

The water permeability (A) of the membrane will decrease when the membrane undergoes fouling at either sides of the membrane. However water permeability is expected to decrease at very high rate with respect to membrane fouling rate at feed side of the membrane surface. The solute permeability ($P_m$) of the membrane will increase when the membrane is fouled at either side of the membrane surface. However the solute permeability is expected to increase at very high rate with respect to membrane fouling rate at draw solution side of the membrane.

On these lines the reflection coefficient ($\sigma$) will decrease when membrane is fouled at either side of the membrane surface. However reflection coefficient is expected to change during initial operating period of membrane, and it becomes constant during the later stage of operation.

Also, the mass transfer coefficient of feed solution side will decrease when membrane porous sub layer is fouled. Therefore this parameter signifies fouling rate at feed side of membrane sub layer. Similarly, the mass transfer coefficient of draw solution side will decrease when the membrane selective layer surface is fouled and therefore this parameter signifies fouling rate of membrane selective layer.

As described herein before, the membrane transport equations have to be integrated with mass and momentum balance equations of membrane module i.e. in respect of spiral or hollow fiber module. Therefore, apart from the above mentioned membrane transport parameters variations with respect to membrane fouling, the parameters of momentum balance equations such as Darcy's coefficient of feed and draw solution channels of module varies with respect to fouling or scaling at feed and draw solution channels.

Darcy's coefficient for feed channels ($\beta_{feed}$) increases when feed channel gets blocked by foulants. Similarly, Darcy's coefficient for draw channels ($\beta_{draw}$) increases when the draw side channel gets blocked by foulants.

Based on interactions between these model parameters, they can be grouped further to derive KPIs for membrane fouling predictions. The derived KPIs for two sides of membrane fouling predictions is given below, KPI for Membrane Fouling Parameter for Feed Side of the Membrane Surface:

$$KPI_{FPF} = \frac{\beta_{feed}}{A k_{CICP}}$$

KPI for Membrane Fouling Parameter for Draw Solution Side of Membrane Surface:

$$KPI_{FPD} = \frac{P_m \beta_{draw}}{\sigma k_{DECP}}$$

Both $KPI_{FPF}$ and $K_{FPD}$ are expected to increase as membrane gets fouled at feed and draw solution side of membrane respectively. Both these KPIs can be estimated from process data of the plant such as flow rate, pressure, salt concentration and temperature of feed and draw solutions at both inlet and outlet points.

Besides the above process data for estimating KPIs, the design information may be utilized. The design information include type of PRO module (spiral or hollow fiber), side of membrane that is exposed to sea water (membrane selective layer or membrane porous sub layer), surface area of single PRO module and membrane material, number PRO modules connected in series and parallel. Further, for spiral module, feed and draw solution side spacer thickness, and number of spiral wounds or length and width of membrane surface can be considered. Similarly, for hollow fiber module, dimensions of hollow fiber viz. inner and outer diameter of fiber, length and number of fibers per module, can be considered.

The fouling rates at both sides of the membrane are different because they get exposed to different quality of water i.e., sea water and fresh water. As a result of which, the membrane gets fouled severely on one side while it is moderately fouled on the other side. However, it becomes imperative to clean the membrane whenever either side of the membrane reaches critical fouling i.e., exceeding threshold KPI value resulting into more number of plant shut downs for cleaning.

It would be appreciated if the fouling rate is maintained almost at same rate in respect of either side of the membrane. Accordingly, it becomes necessary to control the fouling rate on both the sides of the membrane by which the fouling rate on either side of the membrane is maintained at same or almost same rate.

In relation to this, the flow between feed and draw solution side is altered optimally in order to maintain same fouling rate on both the sides, which results in reduced number of plant shutdown times for cleaning. In FIGS. 2a and 2b, the cleaning sequence for both sides of membrane in respect of the PRO system that being operated without and with flow alteration, respectively, is shown.

As shown in 2a, the number of cleaning is more as compared with that shown in FIG. 2b, since there is no flow alteration as in FIG. 2a while there is flow alteration in FIG. 2b. In addition to this, the plant down time due to cleaning activities will be more in the case without flow alteration. This is because the cleaning activities with respect to feed and draw side are scheduled in different time intervals in that case as shown in FIG. 2a while the cleaning activities are scheduled during same time intervals in the case shown in FIG. 2b.

The optimal flow alteration between feed and draw solution side can be achieved by monitoring the derived fouling parameters, $KPI_{FPF}$ and $KPI_{FPD}$. For instance, the flow alteration can be triggered if the fractional change in any of the KPIs i.e., either $KPI_{FPF}$ or $KPI_{FPD}$ exceeds a predetermined percentage of the threshold value. The predetermined percentage herein may be 50% or the like and is not restrictive. The fractional change in KPIs and the threshold value are calculated as given below.

$$\text{Fractional change in } KPI_{FPF} = \frac{(KPI_{FPF_{t=0}} - KPI_{FPF_{t=t1}})}{KPI_{FPF_{t=0}}}$$

$$\text{Fractional change in } KPI_{FPD} = \frac{(KPI_{FPD_{t=0}} - KPI_{FPD_{t=t1}})}{KPI_{FPD_{t=0}}}$$

$$\text{Threshold value} = \frac{(KPI_{FPD_{t=0}} - KPI_{FPD_{t=t1}})}{KPI_{FPD_{t=0}}}$$

In certain other applications, the membrane module is integrated with other process units to produce power from osmotic energy.

The raw sea water and fresh river water is pretreated using water filters. The pressure required for water filters is generated by the corresponding pre treatment pumps. The pretreated fresh water is pumped to PRO membrane module with pressure force generated by pretreatment pump. On the other side of membrane i.e. at draw solution side, the sea water is pressurized by employing energy recovery device (ERD) along with booster pump. The concentrated fresh water i.e. fresh water bleed is sent back to sea. Similarly, part of high pressure draw solution i.e. diluted sea water or brackish water is sent to the turbine for power generation while another part of the sea water is used in ERD to pump sea water to PRO modules.

The optimization of PRO membrane operation is one of the important activities required to improve PRO module performance. The optimization can be formulated with respect to different objectives in relation to objective function. Some of the main objectives for PRO operation optimization are maximizing energy production from draw solution outlet i.e., diluted sea water outlet/brackish water, Optimal scheduling of membrane maintenance to increase overall PRO module availability and Optimal distribution of load between PRO modules for energy efficient operations.

The objectives referred here above are achieved while considering the two side membrane fouling. The problem formulation with respect to maximizing energy production from draw solution outlet is stated as below:

Feed solution outlet flow rate×Feed solution outlet pressure−energy consumed by the pretreatment and booster pump The decision variables are
Feed solution flow rate/pressure at membrane inlet or speed of the prêt-treatment pump
Feed solution flow rate/pressure at membrane outlet
Draw solution flow rate/pressure at membrane inlet
Draw solution flow rate at energy recovery device (ERD) low pressure inlet
Brackish or feed sea water flow rate at ERD outlet
Pressure at low pressure outlet of ERD
Flow rate at booster pump/speed of booster pump
and, subject to following conditions
Lower limit<Feed solution flow rate at membrane inlet<upper limit
Lower limit<Draw solution flow rate at membrane inlet<upper limit
Lower limit<Draw solution flow rate at membrane outlet<upper limit
Lower limit<Feed solution pressure at membrane inlet<upper limit
Lower limit<Draw solution pressure at membrane inlet<upper limit
Lower limit<Draw solution pressure at membrane outlet<upper limit
Concentration polarization at feed side<upper limit
Concentration polarization at draw solution side<upper limit
Lower limit<Product water level in the tank<upper limit Though the above optimization problem formulation refers to one configuration, the same can be coextensively applied for other kinds of PRO power plant configurations that include but not limited to continuous flow underground PRO plant and alternate flow terrestrial flow PRO plant.

FIG. 3 shows the schema of integrated desalination and pressure retarded osmosis (PRO) processes (300), as one of the possible application. The sea water is treated in a pretreatment section (301) to remove particulate and organic matters which creates fouling at desalination section (302) and PRO section (303). The treated sea water is then pumped by corresponding pumps (304) to both desalination section (302) and PRO section (303) for subjecting it to desalination and PRO processes respectively. Desalination process could be either based on membrane or thermal separation process. The desalination process does the separation of salt from sea water. The desalination separation efficiency i.e. the recovery ratio and total dissolved solids (TDS) of product water will be changing based on process selection and its operating conditions. In PRO process, the fresh seawater is mixed with part of product water to provide less saline water as a feed to PRO section (303). This dilute sea water is pumped to PRO section (303) for PRO process using low pressure pump. The concentrated reject coming out from desalination section (302), after desalination process is fed as a draw inlet to PRO section (303) for PRO process. The low pressure concentrated reject solution is pumped to PRO section (303) using energy recovery device (ERD) (305) by exchanging energy from one part of draw outlet stream of PRO process. The remaining part of high pressure draw outlet is sent to turbine (306) for power generation. The outlet of draw solution from ERD (305) and turbine (306) is re-circulated back to desalination section (302) after pretreatment. Optimal and energy efficient operation requires monitoring and optimization of membrane operation in both RO and PRO process.

In both PRO and RO, the membrane degradation is unavoidable due to continuous membrane fouling and this causes overall integrated system performance to deteriorate. The operating conditions of pump and control valve have to be manipulated to provide sustainable production of power and water. The invention provides system and method that is suitable for monitoring of integrated desalination and PRO process. The optimization of membrane operation can be performed by calculating optimal values for pumps and control valves based on membrane fouling or degradation condition.

The monitoring system obtains necessary data from RO and PRO. The RO data is processed to estimate membrane fouling condition. The typical minimal online measurements for RO membrane monitoring are a) Pressure, flow, concentration and temperature of feed, b) Flow and concentration of product water and c) Differential pressure between feed and reject.

The additional measurements such as a) Pressure and temperature of product water and/or b) Flow, concentration and temperature of reject improves reliability of above mentioned measurements to estimate accurate membrane fouling status.

The monitoring of PRO membrane fouling requires different approach as described here before i.e. in respect of monitoring fouling of a two side membrane fouling process. In this case, the minimal online measurements that is required for estimating fouling condition of membrane at both sides of the PRO membrane are a) Flow rate, pressure, salt concentration and temperature of inlet feed solution and inlet draw solution, b) Flow rate, pressure and salt concentration of outlet feed solution and c) Pressure and salt concentration of outlet draw solution.

Besides the above stated online measurements, the additional measurements such as a) Temperature of outlet feed solution and/or b) Temperature and flow rate of outlet draw solution improves reliability of above stated minimal online measurements to estimate two side membrane fouling status of PRO process.

Optimization of both PRO and RO process in this context includes estimation of optimal operating conditions for PRO and desalination section subject to constraints. The objectives of optimization are a) maximizing power production from PRO, b) maximizing water produced from desalination plant and c) minimizing over all energy consumed in pumps of PRO and desalination section.

Only certain features of the invention have been specifically illustrated and described herein, and many modifications and changes will occur to those skilled in the art. The invention is not restricted by the preferred embodiment described herein in the description. It is to be noted that the invention is explained by way of exemplary embodiment and is neither exhaustive nor limiting. Certain aspects of the invention that not been elaborated herein in the description are well understood by one skilled in the art. Also, the terms relating to singular form used herein in the description also include its plurality and vice versa, wherever applicable. Any relevant modification or variation, which is not described specifically in the specification are in fact to be construed of being well within the scope of the invention. The appended claims are intended to cover all such modifications and changes which fall within the spirit of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for controlling fouling on and cleaning of a feed side and a draw side of a membrane wherein the feed side includes a feed solution and the draw side includes a draw solution, the method comprising:

providing a process model for operation of the feed side and draw side of the membrane, wherein the process model includes one or more parameters indicative of at least one of external concentration polarisation and internal concentration polarisation;

estimating a feed side key performance index and a draw side key performance index from the one or more parameters of the process model;

estimating fouling on the feed side and fouling on the draw side of the membrane based on the feed side key performance index and the draw side key performance index;

altering flow of at least one of feed solution or draw solution based on the estimated fouling at the feed side and the estimated fouling at the draw side for controlling fouling on the feed side and draw side of the membrane to maintain substantially the same fouling rate at the feed side and the draw side of the membrane; and concurrently cleaning the feed side and the draw side of the membrane.

2. The method as claimed in claim 1, comprising:

controlling a two side membrane process by estimating optimal operating conditions for the two side membrane process based on an objective function, and by considering fouling of the membrane.

3. The method as claimed in claim 2, wherein the objective function comprises one or more objectives, which include at least one of increasing energy production, scheduling of membrane maintenance, and distribution of load.

4. The method as claimed in claim 1, wherein the parameters comprise:

at least one of water permeability, solute permeability, reflection coefficient, mass transfer coefficient, Darcy's coefficient, flux, density, viscosity, diffusivity, velocity, flow rate, pressure, salt concentration, and temperature.

5. The method as claimed in claim 4, wherein at least one of the parameters corresponds to a parameter of water and/or solute.

6. The method as claimed in claim 4, wherein at least one of the parameters corresponds to a parameter of feed and/or draw solution.

7. The method as claimed in claim 1, wherein each said key performance index comprises:

a membrane fouling parameter of either side or both sides of the membrane in relation to feed and/or draw solution.

8. The method as claimed in claim 1, performed online or offline.

9. A method for controlling fouling of a two side membrane fouling process, the method comprising:
- determining a process model for the two side membrane fouling process;
- grouping parameters of the process model, based on interactions between the parameters, to form one or more groups of parameters;
- estimating at least one key performance index in relation to the one or more groups of parameters;
- controlling fouling of the two side membrane fouling process in relation to the at least one key performance index by altering a flow of solution on either side or on both sides of the two side membrane to maintain substantially the same fouling rate on both sides of the two side membrane; and
- concurrently cleaning both sides of the two side membrane.

10. The method as claimed in claim 9, comprising:
- altering the flow of solution when a fractional change in the key performance index exceeds a predetermined percentage of a threshold value.

11. The method as claimed in claim 9, comprising:
- controlling the two side membrane process by estimating optimal operating conditions for the two side membrane process based on an objective function, and by considering fouling of the two side membrane.

12. The method as claimed in claim 11, wherein the objective function comprises:
- one or more objectives, which include at least one of increasing energy production, scheduling of membrane maintenance, and distribution of load.

13. The method as claimed in claim 9, wherein the parameters comprise:
- at least one of water permeability, solute permeability, reflection coefficient, mass transfer coefficient, Darcy's coefficient, flux, density, viscosity, diffusivity, velocity, flow rate, pressure, salt concentration, and temperature.

14. The method as claimed in claim 13, wherein at least one of the parameters corresponds to a parameter of water and/or solute.

15. The method as claimed in claim 13, wherein at least one of the parameters corresponds to a parameter of feed and/or draw solution.

16. The method as claimed in claim 9, wherein the key performance index comprises:
- a membrane fouling parameter of either side or both sides of the two side membrane in relation to feed and/or draw solution.

17. The method as claimed in claim 9, comprising:
- altering the flow of solution when a fractional change in the key performance index exceeds a predetermined percentage of a threshold value.

18. A system in a plant employing a membrane separation process, comprising:
- means for: storing a process model regarding operation of the feed side and draw side of a membrane, wherein the process model includes one or more parameters indicative of at least one of external concentration polarisation and internal concentration polarisation, for estimating a feed side key performance index and a draw side key performance index from the one or more parameters of the process model, and for estimating fouling on the feed side and fouling on the draw side of the membrane based on the feed side key performance index and the draw side key performance index; and
- means for altering flow of at least one of feed solution or draw solution based on the estimated fouling at the feed side and the estimated fouling at the draw side for controlling fouling on the feed side and draw side of the membrane to maintain substantially the same fouling rate at the feed side and the draw side of the membrane in order to allow concurrent cleaning of the feed side and the draw side of the membrane.

19. A system in a plant employing a membrane separation process and/or a power generation process, comprising:
- means for: determining and storing a process model regarding a two side membrane fouling process, for grouping parameters of the process model, based on interactions between the parameters, to form one or more groups of parameters, and for estimating at least one key performance index in relation to the one or more groups of parameters; and
- means for controlling fouling of the two side membrane fouling process in relation to the at least one key performance index by altering a flow of solution on either side or on both sides of the two side membrane to maintain substantially the same fouling rate on both sides of the two side membrane in order to allow concurrent cleaning of both sides of the two side membrane.

* * * * *